United States Patent Office

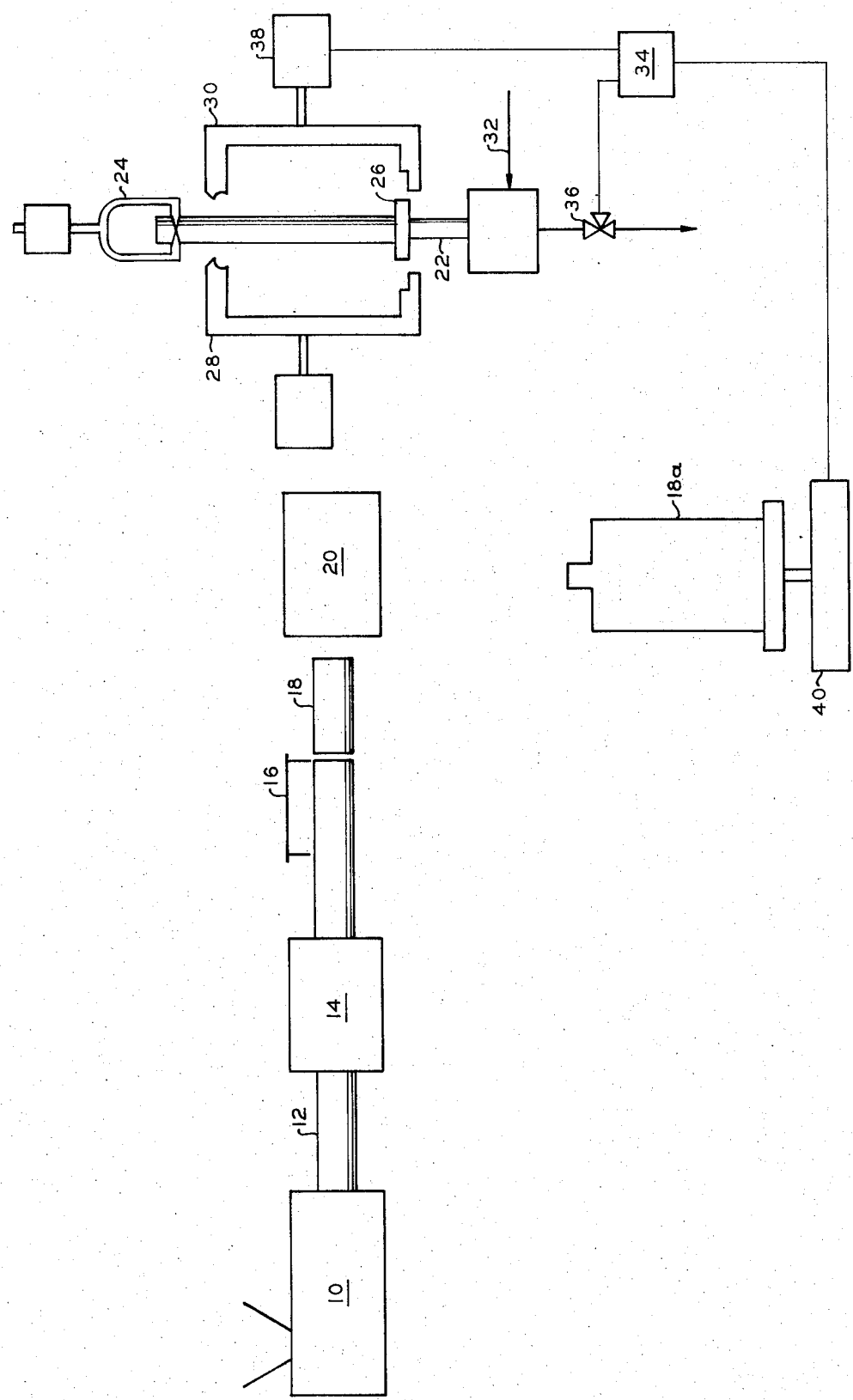

3,848,036
Patented Nov. 12, 1974

3,848,036
DELAYED VENTING IN PRODUCTION OF ORIENTED HOLLOW ARTICLES
Charles L. Seefluth, Bartlesville, Okla., assignor to Phillips Petroleum Company
Filed Oct. 24, 1972, Ser. No. 299,722
Int. Cl. B29c 17/07
U.S. Cl. 264—40                                              9 Claims

ABSTRACT OF THE DISCLOSURE

In the production of oriented hollow articles the mold is opened after the venting has begun but before the venting is complete. Variation of this time sequence, a matter of a fraction of a second, allows calibration of the ultimate volume of the resulting article.

BACKGROUND OF THE INVENTION

This invention relates to the formation of oriented closed end hollow articles. One of the somewhat strange and perplexing realities of the blow molding art is that exact volume of hollow articles such as bottles molded from a given mold can vary depending on process variables such as cycle time, resin type, and the like. In many instances it is not economically feasible to build a different mold for each minor process variation or to exactly size a mold for short runs. This problem can be particularly acute in operations involving formations of hollow articles at orientation temperature.

SUMMARY OF THE INVENTION

It is an object of this invention to produce molecularly oriented hollow articles having a carefully controlled volume;

It is a further object of this invention to calibrate the volume of articles being produced from a given mold; and It is yet a further object of this invention to allow production of hollow articles, of various polymers, having a constant volume without the expense of designing separate molds.

In accordance with this invention mold parts are opened to remove a blown article at a time after venting is begun which time is less than the time required for said venting to be complete.

BRIEF DESCRIPTION OF THE DRAWING

The drawing is a schematic representation of a blow molding apparatus suitable for carrying out the instant invention.

DESCRIPTION OF THE PREFERRED EMBODIMENTS

The instant invention is applicable to the formation of any hollow article such as a bottle, lamp shade, toy, or the like although it is of particular utility in the formation of bottles where careful control of volume is essential.

The invention is applicable to the production of hollow articles from any orientable thermoplastic materials such as polyolefins, nylon, polystyrene, ABS and other butadiene-styrene containing copolymers, poly(vinyl chloride), polyvinylidene chloride polymers and copolymers, and the like. Preferred materials are crystalline polymers such as polymers of at least one mono-1-olefin having 2–8 carbon atoms per molecule, more preferably polymers and copolymers of ethylene, propylene, and butene, most preferably polypropylene.

The fabrication process is carried out at orientation temperature which for crystalline polymers is generally 1–50, preferably 5–25° F. below the crystalline melting point. The invention is particularly applicable to the production of biaxially oriented hollow articles wherein the parison is stretched axially 1.1:1 to 8:1, preferably 1.5:1 to 2.5:1 prior to the introduction of internal fluid pressure to expand same out into conformity with the mold.

It has been the conventional practice in forming blow molded articles to shut off the blow pressure and open the article to the atmosphere to vent the pressure prior to opening the mold. Generally the time required for venting is about ⅓ to ⅔ of a second or at most 0.75 second. Thus in conventional practice the blow pressure is shut off and venting begun about one second before the mold opens. This is because if the mold is open with full blow pressure it will distort the resulting article. Even in accordance with the invention it is essential that the venting begin no later than the time that the mold begins to open. Thus in accordance with the invention the extremes on one hand would be to open the mold at a time after venting is begun, which is the smallest possible finite time less than the time required for the venting to occur and at the other extreme to open the mold at the smallest possible finite time after the venting is begun. Suitable times would be for the mold to open 0.01 to 0.74 second after venting has begun assuming that venting would take 0.75 second. That is, the mold would begin to open at a point in time within the range of 0.01 second after venting is begun to 0.01 second before it is complete. In most instances the mold will be opened 0.1 to 0.5 second after venting has begun. This early opening of the mold relative to venting (or delayed venting relative to opening of the mold) results in a slight increase in volume generally in the range of 0.1 to 3 percent. Thus in a given situation, for example, a bottle can be weighed and if its volume is, for instance, 2 percent below what is desired, the mold can be opened about 0.1 second after venting has begun whereas if the bottles are found to be only a half a percent below the desired volume, the mold can be opened perhaps 0.3 second after venting has begun. The exact timing within the narrow range of a few tenths of a second can easily be determined by experimentation.

Suitable blow pressure for operating in accordance with the invention can be from 100 to 200, preferably from 110 to 170 p.s.i.g.

The formation of oriented articles itself is well known as disclosed in Wiley U.S. 3,496,258, Wiley et al. U.S. 3,507,005, Turner et al. U.S. 3,390,426, and Gilbert U.S. 3,662,049, for instance, the disclosures of which are hereby incorporated by reference.

The total cycle time for transferring a heated parison from a heating zone to a molding zone expanding same into conformity with the mold, opening the mold while venting the pressure from the parison and removing the finished article can be as little as 6 to 8 seconds or less and quite easily as little as 10 seconds or less. The delayed venting relative to the time the mold is opened in accordance with the invention actually adds nothing to the total cycle time. If the cycle time is to remain exactly constant, the invention is effected by delaying the beginning of the venting. Alternatively, the venting can be maintained constant and the mold opened sooner which would actually result in shorter cycle time by a matter of a fraction of a second.

Referring now to the drawing there is shown an extruder 10 forming a continuous extrudate 12 which is passed to a vacuum cooling and sizing chamber 14 and thence to cutting mechanism 16 which forms individual parison preforms 18. Parison preforms 18 are heated to orientation temperature in air oven 20 and transported to position over an internal plug within die hand 22 by means of transfer means 24. Thread forming jaws 26 close on said parison clamping the open end thereof between said jaws and said plug to form the threads. Thereafter mold parts 28 and 30 are closed with the upper portions thereof sealing and severing the parison to form the bottom wall of the resulting article. Internal fluid pressure is then introduced via line 32 to expand said parison out into conformity with the mold walls. Thereafter controller 34 correlates the timing of the venting of the thus expanded parison, by means of opening valve 36, and opening of the mold parts by activation of cylinder 38. The volume of the resulting article, depicted by reference character 18a, can be mechanically determined by filling same with water and recording the weight as on scale 40 as shown in the drawings, which record of the weight is used to generate a signal so as to cause controller 34 to reduce the time interval between the beginning of venting and the mold opening in response to the amount said measured volume is below a predetermined value.

Many conventional parts have been omitted from the drawing for the sake of simplicity but their inclusion is understood by those skilled in the art and is within the scope of the invention.

EXAMPLE I

Propylene homopolymer having a density of 0.905 (ASTM D1505–63T), a melt flow of 2 (ASTM D1238–62T, Condition L), and a crystalline melting point of about 340° F. was extruded into tubing having an outside diameter of 1.150-inch and a wall thickness of 0.150-inch. The tubing was cooled to room temperature in a vacuum sizing and quenching chamber and cut into 7-inch lengths. These lengths were heated to a temperature of about 320° F., and inserted into thread forming jaws similar to those shown in the drawings. The parison was stretched axially to about twice its original length and mold halves were then closed on the stretched parison. Internal fluid pressure of 150 p.s.i.g. was introduced to expand same out into conformity with the mold. The time in the cycle at which the blow pressure was turned off and the venting begun was kept constant and the time of mold opening was varied. For this particular molding operation the time required to vent was approximately 0.5 second. With the normal opening of the mold after the venting was complete the resulting article held 649.9 g. of water. A series of bottles was prepared under these conditions varying the mold opening timing as described below and the results are compared to a bottle conventionally blown.

The volume of the bottle can be increased over a range of about 0.6 to about 2.3 percent by making the adjustments. The mold opening was advanced a fraction of a second so that part of the venting occurred after the mold was opened. The volume was increased to 655.7 g. of water. The mold opening was advanced further and the volume of the resulting article was 659.8 g. The mold opening was advanced further to a point just prior to the beginning of venting. Here the seal leaked as a result of too much pressure within the bottle while the mold was open. The opening time for the mold was then retarded a fraction of a second and the resulting bottle held 658.8 g. of water. Further retarding of the mold opening a fraction (but still after venting had begun) of a second gave a bottle holding 653.9 g. The opening was then advanced again a fraction of a second to give a bottle which held 658.0 g. A final advance of the mold opening to approximately the same time the venting began gave a bottle holding 665.0 g. of water. The blow pressure throughout these runs was 150 p.s.i.g.

EXAMPLE II

A second set of runs was made similar to those of Example I except the mold opening time was kept fixed and the time for turning the blow pressure off and venting the bottle was varied. Utilizing the standard conditions wherein the bottle was vented approximately one second prior to opening the mold so that the venting was complete prior to opening the mold gave a bottle holding 653.2 g. of water. A series of bottles was prepared by retarding and advancing the time the blow pressure was turned off and the article vented within a time period of approximately ½ second prior to opening the mold which ½ second was the approximate time for venting to be complete gave the following results. The first column shows the bottle weight, the second column the weight of the bottle filled with water, and the third column the net weight arrived at by subtracting the bottle weight. As can be seen, the volume increased consistently when the time interval between venting and opening of the mold was decreased as the time interval was increased. Venting was simultaneous with the blow pressure being turned off.

|  | Bottle wt., g. | Water wt., g. | Net water, g. |  |
|---|---|---|---|---|
| Volume check | 31.6 | 684.8 | 653.2 |  |
| Retard blow "off" | 31.4 | 691.5 | 660.1 | Increase. |
| Advance blow "off" | 31.5 | 690.9 | 659.4 | Decrease. |
| Retard blow "off" | 31.3 | 694.4 | 663.1 | Increase. |
| Do | 31.8 | 665.2 | 663.4 | Do. |
| Advance blow "off" | 31.2 | 693.8 | 662.6 | Decrease. |
| No change blow "off" | 31.2 | 694.0 | 662.8 |  |

The results show that the volume of the bottle can be increased about 1 to about 1.5 percent by making the described adjustments.

While this invention has been described in detail for the purpose of illustration it is not to be construed as limited thereby but is intended to cover all changes and modifications within the spirit and scope thereof.

I claim:

1. In a method for forming oriented closed end hollow articles comprising heating a thermoplastic parison to orientation temperature, expanding said parison out against a mold formed by two mold parts while said parison is at said orientation temperature, by the introduction of internal fluid pressure, venting said thus formed hollow article to relieve said pressure and opening said mold parts enclosing said thus formed hollow article to remove same, the improvement comprising: opening said mold parts at a time after said venting is begun, which time is less than the time required for said venting to be complete, the volume of said hollow articles being measured and the time interval between said beginning of venting and said opening of said mold parts being adjusted in response to the amount said measured volume is different from a predetermined value to achieve a desired volume.

2. Method according to claim 1 wherein said mold parts are opened at a time within the range of 0.01 second after said venting is begun to 0.01 second before venting is complete.

3. Method according to claim 1 wherein said mold parts are opened within 0.1 to 0.5 second after said venting is begun.

4. Method according to claim 1 wherein said parisons are made of polypropylene.

5. Method according to claim 1 wherein said parisons are stretched axially prior to the introduction of fluid pressure.

6. Method according to claim 1 wherein a total cycle time is 10 seconds or less.

7. Method according to claim 1 wherein said hollow article is a bottle.

8. Method according to claim 7 wherein said parisons are made of polypropylene.

9. Method according to claim 8 wherein said internal fluid pressure is within the range of 110–170 p.s.i.g.

References Cited
UNITED STATES PATENTS

| 3,390,426 | 7/1968 | Turner et al. | 264—99 UX |
| 3,358,062 | 12/1967 | Lemelson | 264—98 X |
| 3,570,057 | 3/1971 | Doyle | 425—326 B X |
| 3,291,877 | 12/1966 | Clement | 264—100 |

JAN H. SILBAUGH, Primary Examiner

U.S. Cl. X.R.

264—99; 425—Dig. 203 C